INVENTOR:
CARL H. GERLACH

INVENTOR:
CARL H. GERLACH
BY
ATT'Y

Patented July 8, 1952

2,602,412

UNITED STATES PATENT OFFICE 2,602,412

WELDING ROD FEEDING DEVICE FOR TORCH CARRIAGES

Carl H. Gerlach, Maple Heights, Ohio

Application May 3, 1948, Serial No. 24,897

6 Claims. (Cl. 113—59)

(Granted under the act of March 3, 1883, as amended April 30, 1928; 370 O. G. 757)

This invention is more particularly described as an attachment for supporting and guiding an oxy-acetylene cutting and welding torch, which simplifies regulation of the height of the torch to which it is attached, and permits manual adjustment without interrupting the cut or weld.

Important objects of the invention are, to provide an aid in ordinary metal cutting with manually operated gas cutting torches; to facilitate welding by more easily feeding a welding rod manually or by feeding the rod automatically at a selected rate; and to aid in cutting stainless steel and other materials cut with difficulty, by automatically feeding the rod at a selected rate into the flame, so that the heat of oxidation of the rod metal mixing into the cutting flame fortifies the heat of the flame and aids in cutting the material.

A further object of the invention is to provide a multi-purpose device capable of various dispositions or combinations of parts permitting changes of feed of the welding rod, changes in the size or shape of the rod, changes in the function or operation of the device, and permitting use of the device as a support and guide for the torch.

Other objects of the invention will appear in the specification and will be apparent from the accompanying drawings, in which, Fig. 1 is a perspective view illustrating the invention as attached to a torch used in cutting a plate;

Figure 1:
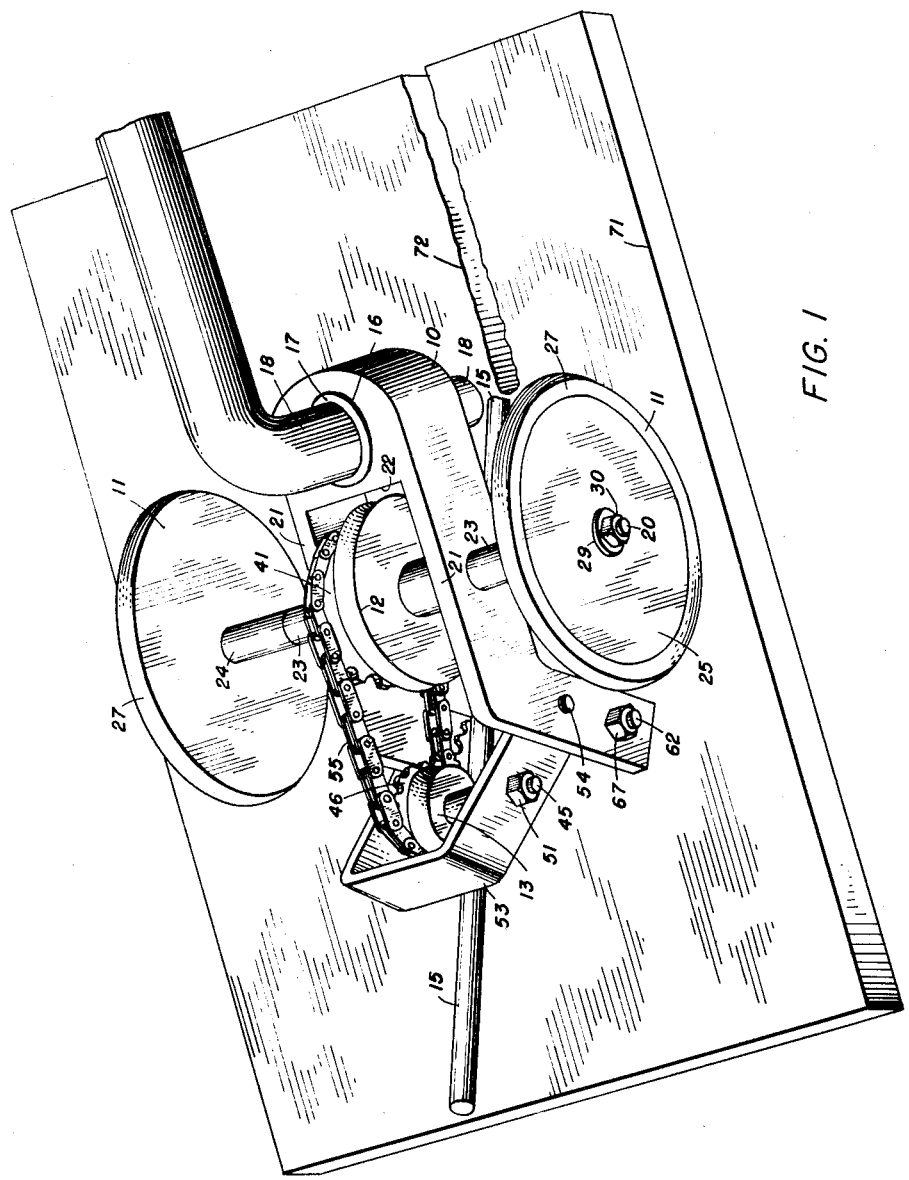
Figure 2:
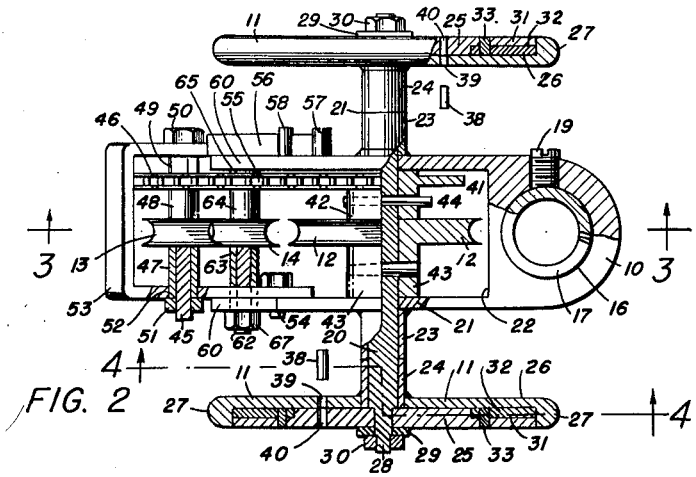
Fig. 2 is a plan view of the attachment shown in Fig. 1, with some of the parts in section.

This invention improves the use and application of a welding torch for both cutting and welding, by regulating the height relative to the work, and by feeding a welding rod automatically, or by facilitating the movement of the rod manually. A further advantage is in the mounting of the supporting wheels for ratcheting and differential movements, resulting in a step by step movement of the welding rod when desired.

Referring now more particularly to the drawings, a supporting frame 10 is mounted for movement on wheels 11 and carries three grooved wheels or sheaves 12, 13, and 14 for holding and moving a welding rod 15. At one end of the frame is a perforation 16 for receiving a split sleeve 17 which may be varied in size or shape, particularly as to the inner opening, to receive a welding torch tip 18 and to hold it at various heights and angles in the frame. A set screw 19 is inserted at one side of the frame and extends into the perforation to engage sleeve 17 and to clamp the torch tip adjustably in place.

An axle 20 extends freely through transverse holes in spaced apart side frame portions 21 which form a central recess 22 in the frame. A tubular sleeve 23 is secured to the outer side of each frame portion 21 to provide a more substantial bearing for the axle, and a bearing sleeve 24 is secured to the inner periphery of each wheel 11, which abuts the outer end of the corresponding sleeve 23. This spaces the wheel outwardly from the frame and allows each wheel to rotate freely on the axle.

A one way ratchet drive for each wheel comprises a disc 25 seated in a recess 26 at the outer side of the wheel inside of a rim 27. The disc is mounted on and secured to a reduced and threaded end 28 of axle 20 by a washer 29 and a nut 30 which presses the disc against the shoulder formed by the reduced end. Mounted in an outer circular recess 31 at the inner side of each disc 25, between it and its wheel 11, are four thin circular pawls 32 each pivoted freely and eccentrically upon a bearing pin 33 secured to the disc and adapted to be moved to bindingly engage the inside of the wheel rim 27.

For any rotated position of the wheel at least one of the pawls will fall into engaging position by gravity, or if the wheel is rotated at sufficient speed the pawls will assume clutching positions by centrifugal action. For each pawl 32 a flat spring 34 having an eye 35 at one end is inserted in a radial slot 36 in the disc, having an inner enlargement 37 to receive and retain the eye, and the other end projects outwardly into the recess 31 to engage one side of the pawl tending to rotate it into binding or clutching relation.

This ratchet device allows the torch carrying attachment to roll freely over the work without turning the axle 20 in one direction, when the wheels turn clockwise in Fig. 1, and to impart motion to the axle and the parts to which it is connected, when the wheels turn in a counterclockwise direction.

To lock either wheel and its disc together, a pin 38 is inserted in registering holes 39 in the wheel and 40 in the disc. This makes them the equivalent of a solid wheel which rotates with the axle 20.

A sprocket 41 and the sheave 12 are mounted on the axle 20 between side frame portions 21 and have hubs 42 and 43 respectively, each adapted to be keyed or locked on the axle by inserting a taper pin 44 through the hub and axle.

Sheave 13 is mounted on an axle 45 in line with sheave 12 and sprocket 46 is mounted on the axle in line with the sprocket 41 on axle 20. Sleeves 47, 48 and 49 on axle 45 space the sheave 13 and sprocket 46 apart and between a head 50 at one end and a nut 51 at the other end of the axle. This assembly is freely rotatable in holes 52 in the sides of U-frame 53 and is retained therein by the head 50 and nut 51 at the outer sides. The U-frame in turn is mounted free to rotate upon side frame portions 21 on bearing screws 54.

A sprocket chain 55 extends around sprockets 41 and 46 to rotate sheave 13 in accordance with the movement of sheave 12 or axle 20. To keep the sheave 13 in engagement with the rod 15, a flat spring 56 having an eye at one end engaged by a machine screw 57 extends through a fillister head screw 58, both screws being fixed in the side frame, and the other end of the spring 56 engages a projection 59 at the edge of the U-frame 53. This presses the outer end of frame 53 outwardly from the frame 10 thus tensioning the chain 55 and exerting a driving force through the sheave 13 upon the rod 15.

Side frame portions 21 terminate in angular extensions 60 in which are mounted the sheave 14 and a sprocket 61 for rotating it. This mounting assembly comprises an axle 62 with the sheave, sprocket and spacing sleeves 63, 64, and 65 clamped between a head 66 at one end and a nut 67 at the other, freely rotatable in the extensions 60, and retained therein by the axle head and the nut 67 at the outer sides thereof. Sprocket chain 55 may be connected around sprockets 41 and 61 to drive sheave 14 when desired, since the sprockets 61 and 46 may be spaced an equal distance from sprocket 41.

With this construction a welding rod 15 may be supported by the three sheaves 12, 13, and 14, as shown more clearly by Figs. 1 and 3, so that the lower end of the rod is in position below the welding torch tip and between it and a plate 71 in which a cut 72 is being made by the torch. The wheeled frame supports the torch tip at the proper height above the plate, which may be varied manually as desired by raising or lowering the torch handle and the frame may be moved in either direction. The welding rod may be moved toward the torch for either relative direction of movement of the frame upon the wheels, and may be advanced by a step-by-step or ratchet movement by alternately moving the frame to and fro upon its mounting wheels.

Sprocket chain 55 may be used to drive either sheave 13 or sheave 14 on opposite sides of the rod 15, thereby tending to move it in relatively opposite directions. Spring 56 pressing sheave 13 against the rod, serves to hold it yieldingly in place between the three sheaves 12, 13, and 14 for advancing movement by one of them.

All sheaves may be replaced by others of different size or shape to accommodate a change in size or shape of the rod 15 or to vary the feed relative to the movement of the frame over the work. Sheave 12 may rotate freely upon its axle 20 either by omitting a taper pin 44 from engaging its hub and the axle, or the sheave may be separate from its hub 43 to allow for driving the rod 15 by a driving connection either with sheave 13 or sheave 14.

Sprocket 41 is ordinarily pinned to its axle 20 by its taper pin 44, driving either sheave 13 or 14, depending upon the one to which it is connected by sprocket chain 55. If desired, pulleys and belts may be substituted for the sprockets and sprocket chains. The taper pin for sprocket 41 may be removed, and the sheave 12 may be connected to the axle 20 when it is desired to move the welding rod 15 with the sheave 12, using the other sheaves 13 and 14 only as idlers to hold the rod in place.

Figure 3:
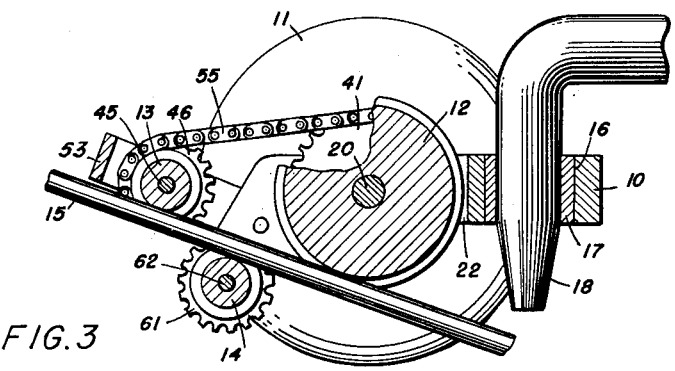
Fig. 3 is a sectional view taken on the line 3—3 of Fig. 2.
Figure 4:
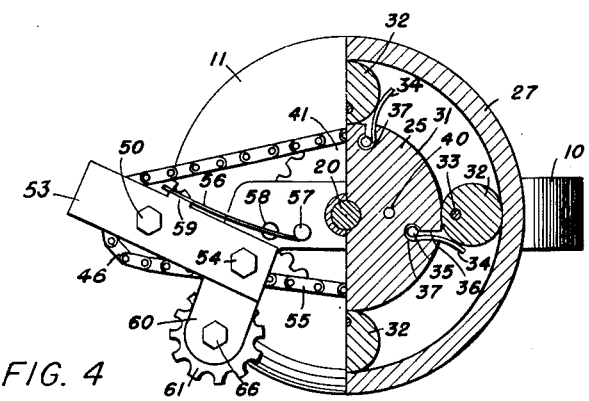
Fig. 4 is an elevational view of the side of the structure shown in Fig. 2 with parts approximately on the line 4—4 shown in section.

When the sprocket 41 is pinned to its axle 20 and chain 55 connects it with sprocket 46, in making a cut 72 in plate 71, sheave 13 will rotate to drive the rod 15 toward the torch flame, with the mounting wheels 11 turning in the counter-clockwise direction, as shown in Figs. 1 and 3, and the other two sheaves 12 and 14 free to turn. In a similar manner to make a weld in the cut 72, sheave 14 is used as a driver of rod 15 moving it toward the torch flame when the wheels are solid and turning in the clockwise direction as shown in Figs. 1 and 3. The ratcheting arrangement in the wheels will operate to advance the rod 15 step by step my moving the attachment to and fro when the sheave 13 is connected as above set forth, and will advance the rod step by step when sheave 14 is so connected, provided that the ratcheting arrangement is either locked with the wheels, or reversed by inverting the discs 25 and the ratcheting parts.

As a modification, the sheave 12 being located centrally between the side frame portions with its hub at one side and the sprocket and its hub at the other side, the axle may be split transversely and centrally of the sheave which is attachable to one axle part and the sprocket to the other, to move the parts separately. In this case the axle ends will be aligned by the sheave 12 and they will be retained in the frame by the sprocket and sheave attached thereto between the side frame portions 21.

When the sheave 12 is to drive the rod 15, in the case of a split axle 20, the sprocket is pinned to its axle portion but the driving chain will be removed.

With these constructions and arrangements the attachment may be used with a suitable torch tip for welding or for cutting, the torch may be properly spaced for the work depending upon the type of work to be performed, and the welding rod may be fed in the direction of the torch for either direction of movement of the attachment. Step by step movement of the welding rod may be effected by both wheels, or if the main axle is divided, there may be a differential movement of the wheels, as in cutting or welding in a curved path, and the feeding of the rod may be effected by one wheel.

While a preferred form and some modifications are thus described in some detail, these constructions should be considered as illustrations or examples rather than limitations or restrictions of the invention, since various changes may be made in the constructions, combinations and arrangements of the parts without departing from the spirit and scope of the invention.

This invention described herein may be manufactured and used by or for the Government of the United States of America for governmental purposes without the payment of any royalties thereon or therefor.

I claim:

1. In an attachment frame for supporting a torch tip and a welding rod, means at one end of the frame for attaching the torch tip, spaced frame portions and an axle extending therethrough with frame supporting wheels at the outer ends, a driving sheave and a sprocket rigidly mounted on the axle between the frame portions, the frame having angularly extending frame portions, a U-frame mounted in the frame portions to project outwardly therefrom, an assembly of a sheave and sprocket coaxially mounted on an axle in the frame portions and another sheave and sprocket in the U-frame on opposite sides of the welding rod, the rod being movably supported by the three said sheaves and a sprocket chain to connect the first sprocket with either of the other two sprockets, the supporting sheaves being adapted to move the welding rod by driving contact with any one of said sheaves spring means forcing the supporting sheaves associated with said other two sprockets together whereby the direction of motion of the rod is determined by the supporting sheave driven by the sprocket chain.

2. In a welding rod feed device attached to a carriage having a welding torch tip carried thereby and rotatable carriage propelling wheels where the rod is to be automatically fed by movement of the carriage, the improvement comprising a first motion transferring wheel fixedly and coaxially connected to the shaft of said rotatable carriage wheels, first and second contiguous, vertically-displaced rod guide wheels for guiding the rod therebetween including respective centrally rotatable axles mounted on said carriage displaced from and parallel to the shaft of the said carriage wheels, a third rod guide wheel fixedly and centrally mounted on said carriage wheel shaft for guiding a welding rod in cooperation with said first and second guide wheels at an inclined angle into said welding torch tip, first and second belt engaging wheel means mounted on said respective axles for rotating said respective axles in response to an external force applied thereto, a belt extending from said motion transferring wheel to one of said belt engaging wheels which will feed said rod into the working area as said carriage wheels are moved in a given predetermined direction.

3. The combination of claim 2 characterized further by the distance between the outermost points of each of said belt engaging wheel means and said motion transferring wheel being equal whereby the same belt may readily be transferred from one belt engaging wheel means to another when the carriage is to be moved in a different direction for rod feeding.

4. The combination of claim 2 characterized further by a one-way ratchet drive mechanism associated with said carriage wheels for transferring the rotary motion of the rims of said carriage wheels to the carriage wheel shaft only when said carriage wheels are moving in said predetermined direction.

5. A rod feeding mechanism comprising a frame having a welding torch tip and a rod feeding attachment thereon and wheels including outer rims for making contact with a working surface and a central shaft member, means coupling said shaft to said rod feed mechanism, first means for coupling the rotary motion of the rims of said rotatable wheels to said rod feeding attachment through said shaft member for causing the latter attachment to feed a rod toward a working surface when said carriage wheels are rotated in a given predetermined direction, said first means including a one-way drive mechanism for coupling motion to said shaft member in only one direction of rotation of said wheels whereby the rod feed may be selectively controlled by a back-and-forth motion of said frame.

6. In a rod feed mechanism having a carriage with wheels for movement over a working surface, a welding torch tip and a rod feed attachment on said carriage coupled to said carriage wheels for feeding a rod toward the working surface in response to the movement of the carriage wheel axles, a one-way wheel drive for each carriage wheel for causing said rod feed attachment to be operative when said carriage wheels are moved in only one direction by coupling the motion of the outer rim of the associated wheel to the wheel axle comprising a circular disc coaxial of the outer rim of the wheel, said disc fixedly connected to the axle of the associated wheel, an annular recess in the side and extending to the outer periphery of said disc, a plurality of circular pawls pivoted freely and eccentrically on said disc and positioned in spaced relation within said recess, the distance between the eccentric pivot and the outermost point on said pawl sized to permit engagement of said pawl with the inner surface of a portion of the rim of the associated wheel, a spring for each pawl having an eye at one end inserted in and adjacent slot in said disc, said slot having an inner enlargement to receive and retain the eye, the other end of said spring projecting outwardly into the said annular recess to engage one side of the pawl tending to rotate it into clutch relation with the wheel rim.

CARL H. GERLACH.

REFERENCES CITED

The following references are of record in the file of this patent:

UNITED STATES PATENTS

| Number | Name | Date |
| --- | --- | --- |
| 895,026 | Jottrand et al. | Aug. 4, 1908 |
| 934,235 | Teschemacher et al. | Sept. 14, 1909 |
| 1,773,664 | Eberle | Aug. 19, 1930 |
| 1,749,719 | Reiter | Mar. 4, 1930 |
| 1,994,700 | Halbing | Mar. 19, 1935 |
| 2,005,407 | Hutchison | Dec. 22, 1936 |
| 2,398,355 | Bristol | Apr. 16, 1946 |
| 2,442,505 | Millett | June 1, 1948 |